May 4, 1965   J. A. RICHARDS, SR   3,181,408
RECIPROCATING TOOL ACTUATED BY TOGGLE JOINT MEANS
Filed Dec. 21, 1960   2 Sheets-Sheet 1
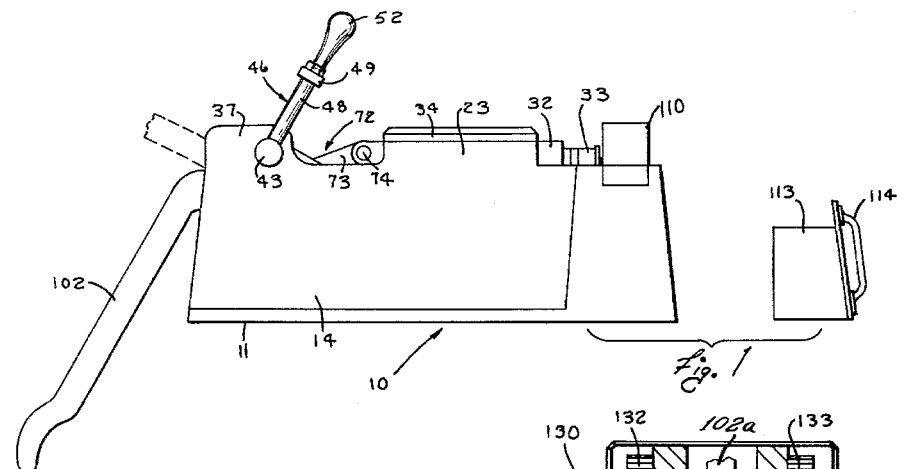
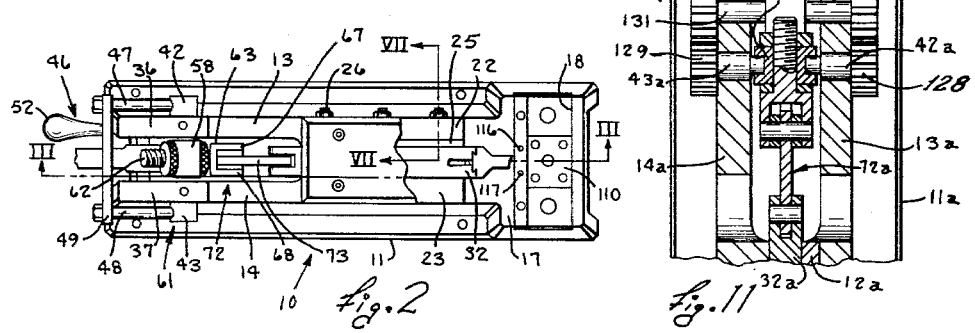
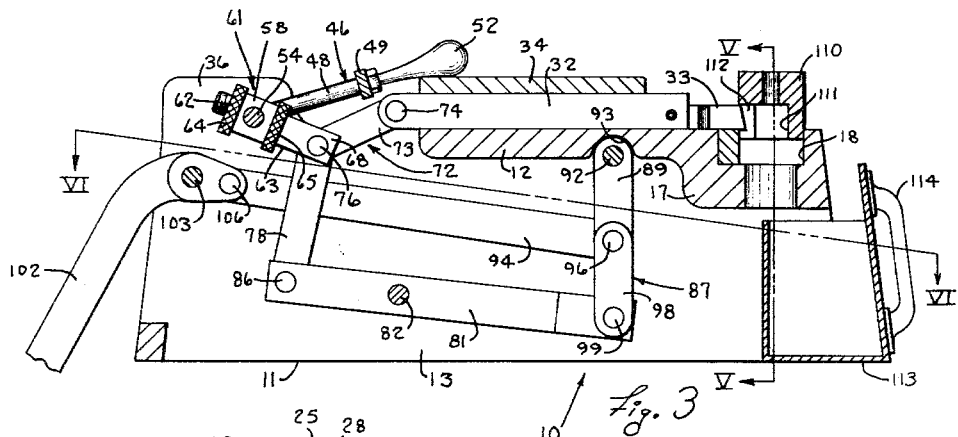
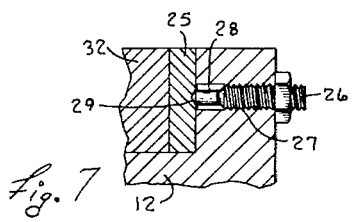
INVENTOR.
JOHN A. RICHARDS, SR.
BY
Woodhams, Blanchard & Flynn
ATTORNEYS

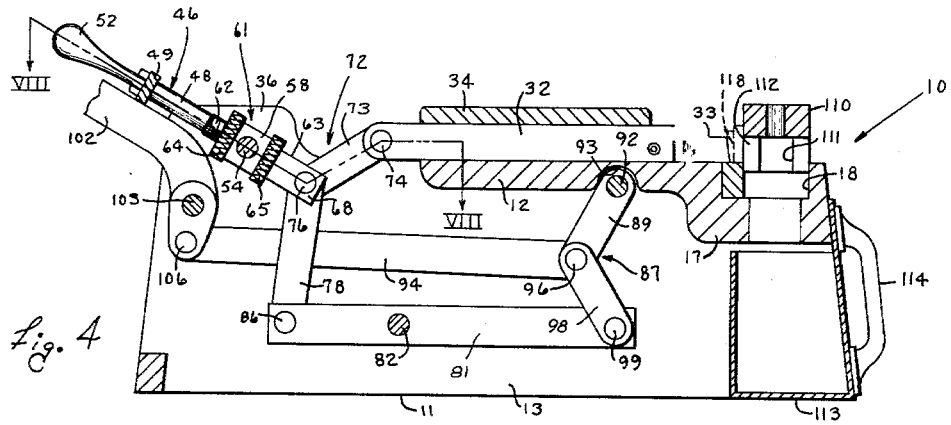

United States Patent Office 3,181,408
Patented May 4, 1965

3,181,408
RECIPROCATING TOOL ACTUATED BY TOGGLE JOINT MEANS
John A. Richards, Sr., Kalamazoo, Mich., assignor to J. A. Richards Co., Kalamazoo, Mich., a partnership
Filed Dec. 21, 1960, Ser. No. 77,366
4 Claims. (Cl. 83—630)

This invention relates in general to a machine having a power train capable of developing a very powerful and substantially constant, mechanical force for a relatively short distance and, more particularly, to a type thereof whereby an operation can be performed upon an extremely tough workpiece which is rigidly held with respect to the frame structure of the machine.

For the purpose of illustration, and by way of example, the invention will be disclosed as it applies to a machine which is used in the manufacture of "steel rule dies." However, it will be recognized that the power train, which embodies the invention, can be adapted for use in a variety of machines for many different purposes.

Steel rule dies are usually comprised of a die base (FIGURES 9 and 10), which may be a wooden block, and a steel strip which is snugly inserted into a slot provided in the block. One lengthwise edge of the strip projects beyond one surface of the block to provide the cutting edge of the die. The opposite lengthwise edge of the strip is flush with the opposite surface of the block, so that said opposite edge and surface can be positively engaged by a press, or the like, for effecting a movement of the block and a resultant cutting operation. The parts of the die base located upon opposite sides of the steel strip are often connected by integral bridge elements, which are located at spaced intervals and extend across said slot.

Thus, where the cutting edge is provided by a single strip, a notching operation must be performed upon the strip at the intervals therealong where the bridge elements will be located. Such notching must be performed without distorting the strip so that it can be inserted into the snugly fitting slot in the die base.

Because of the extremely tough and durable material, such as hardened steel, which is used in the steel strips of said steel rule dies, it is extremely difficult to cut the above-described notches in the steel strip. Heretofore, it has often been necessary to use costly punch presses or relatively slow, cutting and grinding procedures which are sometimes inaccurate and generally involve bulky, space-consuming machines. This applies especially to the heavy gauge strips in the steel rule dies which are used to cut or blank parts from sheet metal.

Accordingly, a primary object of this invention has been the provision of an extremely powerful, yet relatively small and inexpensive, machine having a power train capable of applying a very powerful and substantially constant force for a relatively short distance whereby a tool can be caused to perform a notching operation upon the steel strips used in steel rule dies.

A further object of this invention has been the provision of a machine, as aforesaid, which can be adjusted so that it applies an extremely powerful force to a shearing or notching tool in a small stroke, the location of which can be moved with respect to said machine in the direction of the stroke.

A further object of this invention has been the provision of a notching machine, as aforesaid, which can be easily and manually moved from one working location to another by any average workman capable of operating such a machine, which can easily be operated by said workman, which requires little or no maintenance, which can be easily adjusted to vary the power and length of the stroke without using any tools, and which is extremely sturdy in construction and safe in operation.

Other objects and purposes of this invention will become apparent to persons familiar with this type of equipment upon reading the following specification and examining the accompanying drawings, in which:

FIGURE 1 is a side elevational view of a notching machine embodying the invention.

FIGURE 2 is a top plan view of said machine with a portion thereof in a different operating position.

FIGURE 3 is a sectional view taken along the line III—III in FIGURE 2.

FIGURE 4 is a sectional view similar to that shown in FIGURE 3 with the parts thereof in different positions of operation.

FIGURE 5 is a sectional view taken along the line V—V in FIGURE 3.

FIGURE 6 is a sectional view taken along the line VI—VI in FIGURE 3.

FIGURE 7 is a sectional view taken along the line VII—VII in FIGURE 2.

FIGURE 8 is a sectional view taken along the line VIII—VIII in FIGURE 4.

FIGURE 9 is a top view of a steel rule die.

FIGURE 10 is a sectional view taken along the line X—X in FIGURE 9.

FIGURE 11 is a fragment of FIGURE 8 showing a modified structure.

For convenience in description, the terms "upper," "lower," and derivatives thereof and words of similar import will have reference to the notching machine disclosing the invention when in its operating position, as appearing in FIGURE 1. The terms "front," "rear," and derivatives thereof and words of similar import will have reference ot the right and left ends respectively of the machine as appearing in FIGURES 1 to 4, inclusive. The terms "inner," "outer," and derivatives thereof and words of similar import will have reference to the geometric center of said machine and parts thereof.

General description

The objects and purposes of the invention, including those set forth above, have been met by providing a notching machine comprised of a rigid frame structure, having a fixture on one end for engaging a workpiece, and a manually engageable lever supported upon the other end thereof. A tool supporting bar is slidably supported upon the frame structure and is connected by a power train to said lever for lengthwise movement toward and away from the fixture in response to movement of said lever. The end of the tool bar remote from the fixture is pivotally engaged by one end of a first toggle joint, the other end of which is pivotally supported upon a crankshaft which is in turn pivotally supported upon the frame structure.

The lever is connected to the knee of the first toggle joint by linkage including a second toggle joint and a second lever, whereby pivotal movement of the first toggle joint results in lengthwise reciprocation of the tool bar. The location of the tool bar can be varied by rotating the crankshaft. The mechanical advantage of the linkage can be changed somewhat by adjustment of the throw of the first toggle. A receptacle is provided in the frame structure for receiving the waste produced by the notching operation.

Detailed description

The notching machine (FIGURES 1 and 2), which has been selected to illustrate the preferred embodiment of the invention, is comprised of an elongated frame structure 11 which is preferably fabricated from a durable rigid material, such as cast iron. The frame structure 11 has, in this particular embodiment, a top wall 12 (FIGURE 3) and a pair of side walls 13 and 14 (FIGURE 6) which are integral with said top wall and extend the full length of said frame structure. The top wall 12 has a thickened front portion 17 with a transverse die-receiving slot 18 (FIGURES 3 and 5) in the upper surface thereof. Said top wall 12 (FIGURES 3 and 8) also has a lengthwise opening 19 which is parallel with the side walls 13 and 14 and extends from the rearward ends thereof about one third of the length of the frame structure 11. A pair of parallel, spaced guide bosses 22 and 23 are integral with and extend upwardly from the top wall 12 approximately midway between the ends of the frame structure 11.

An adjustment bar or gib 25 (FIGURES 2 and 7) is supported upon the top wall 12 adjacent to the inner surface of the guide boss 22, which is thinner than the guide boss 23 by the thickness of said gib 25. Three parallel, spaced adjustment screws 26 are threadedly received into threaded openings 27 (FIGURE 7) through the guide boss 22. A gib pin 28 is disposed within each opening 27 between the adjustment screw 26 and the adjacent surface of the adjustment bar 25, which is provided with slight recesses 29 for receiving the gib pin 28. Thus, the gib pins 28 and adjustment screws 26 serve to position the gib 25 lengthwise of the screw 26 while opposing movement of said gib transversely of said screw.

An elongated tool bar 32 (FIGURES 2 and 3) is slidably supported upon the top wall 12 snugly between the guide boss 23 and the gib 25 for movement lengthwise thereof. A punch 33, which has a substantially rectangular front profile in this particular embodiment, is rigidly and removably secured upon the front end of the tool bar 32. The combined length of the tool bar 32 and punch 33 is such that they can simultaneously extend beyond the rear and front ends, respectively, of the guide bosses 22 and 23. A cover plate 34 is mounted upon and extends across the guide bosses 22 and 23 but is spaced slightly from the upper surface of the tool bar 32 to permit sliding movement thereof.

The rearward ends of the side walls 13 and 14 (FIGURES 2 and 8) have integral upward extensions 36 and 37, which have coaxial shaft openings 38 and 39 therethrough.

A pair of preferably identical stub shafts 42 and 43, respectively, extend through, and are rotatably supported within, the shaft openings 38 and 39. The outer ends of the stub shafts 42 and 43 have radially disposed openings 44 and 45 into which the rods 47 and 48 of the fork 46 are rigidly secured. Said rods extend substantially equal distances from the common axis of said stub shafts and are connected at their outer ends to the tie bar 49. A hand grip 52 is secured to the central portion of the tie bar 49 and extends therefrom in a direction radially of said stub shafts.

The stub shafts 42 and 43 (FIGURE 8) have coaxial, inner end portions 53 and 54 which are of reduced diameter and eccentric with respect to the remainder of the stub shafts. The eccentric end portions 53 and 54 are rotatably and snugly disposed within corresponding, coaxial recesses 56 and 57 in the opposite sides of a pivot block 58. A threaded opening 59 extends through said pivot block 58 and is perpendicular to the common axis of said recesses 56 and 57, but spaced from said recesses. The fork 46, stub shafts 42 and 43, and the pivot block 58 constitute a stroke control device 61, which is connected to the tool bar 32 by the toggle joint 72.

A screw 62 (FIGURE 8), which is secured at one end to the web of a yoke 63, is threadedly disposed within the threaded opening 59 in the pivot block 58. The lock nuts 64 and 65 are engaged with the screw 62 for holding it in a selected position with respect to the pivot block 58. The arms 67 and 68 of the yoke 63 are spaced from, but extend toward, the rear end of the tool bar 32, which has a substantially vertical slot 69 therein.

The screw 62 and yoke 63 (FIGURE 8) comprise one element of the toggle joint 72. The other element 73 of the toggle joint 72 is pivotally supported at one end within the slot 69 in the tool bar 32 by the pin 74.

The other end of the element 73 is disposed between, and is pivotally supported upon, the arms 67 and 68 of the yoke 63 by means of the pivot pin 76, which is disposed at the knee of the toggle joint 72. The thrust links 77 and 78 are pivotally supported at the upper end of each upon the pivot pin 76 on opposite sides of the element 73, but between the arms 67 and 68.

A substantially horizontal lever 81 (FIGURES 3 and 6) is pivotally supported between the ends thereof upon and between the side walls 13 and 14 by means of the pivot shaft 82. In this particular embodiment, the pivot shaft 82 is located below the rearward end of the cover plate 34 and somewhat closer to the rearward than to the fortward end of the lever 81. The lever 81 has a pair of spaced, lengthwise slots 83 and 84 in the rearward end thereof into which the lower ends of the links 77 and 78 are slidably disposed for pivotal connection to the lever 81 by the pivot pin 86.

The toggle joint 87 (FIGURES 4 and 6) which is located near the front end of the frame structure 11, includes a pair of parallel spaced upper elements 88 and 89 which are pivotally supported at their upper ends upon the pivot pin 92 which is secured to and extends between the side walls 13 and 14 near the upper edges thereof. The lower side of the top wall 12 is recessed at 93 to receive the pivot pin 92 and the upper ends of the upper elements 88 and 89, whereby the toggle joint 87, which extends substantially vertically, may be as long as possible. The lower ends of the upper elements 88 and 89 are pivotally secured upon opposite side of one end of the thrust bar 94 by means of the pivot pin 96. The lower elements 97 and 98, which are also part of the toggle joint 87, are pivotally supported at the upper end of each upon the outer ends of the pivot pin 96. The lower ends of said lower elements 97 and 98 are pivotally supported by means of the pivot pin 99 upon opposite sides of the lever 81 at the front end thereof.

A manually operable handle or lever 102 (FIGURES 4 and 6) is pivotally mounted near one end thereof upon and between the side walls 13 and 14 near the rearward ends thereof and below the pivot block 58, by means of the pivot rod 103. The near end of the manual lever 102 (FIGURE 6) has a slot 104 into which the rearward end of the thrust bar 94 is slidably and pivotally supported by the pivot pin 106. The rearward end of the thrust bar 94 slidably extends between the thrust links 77 and 78.

The handle 102 (FIGURE 3), thrust bar 94, toggle joint 87 and lever 81 are preferably arranged so that the knee of the toggle joint 72 is substantially straight when the handle 102 is in its lowest position, thereby utilizing the toggle joint 87 through its most powerful range. The throw and the mechanical advantage of the toggle joint 72 can be changed by lengthwise adjustment of the screw 62 with respect to the pivot block 58.

A die 110 (FIGURES 2, 3 and 5) is removably secured within the die slot 18 and has a downwardly opening cavity 111, which communicates with the interior of the frame structure 11 near the front end thereof. Said die 110 has a vertically elongated, substantially rectangular punch opening 112 in its rearward surface which is accurately aligned with the punch 33 and which communicates with the cavity 111. An upwardly opening receptacle 113, having a handle 114, is slidably insertable into the front end of the frame structure 11 beneath the cavity 111 for receiving waste materials urged by the punch 33 into and through the punch opening 112.

A pair of spaced, parallel and substantially vertical guide pins 116 and 117 (FIGURE 2) are rigidly secured upon the supper surface of the front portion 17 of the top wall 12 adjacent to, but spaced from the rear surface of the die 110. The guide pins 116 and 117 serve to position approximately the workpiece 118, which may be an elongated strip of steel, with respect to the rearward face of the die 110.

FIGURES 9 and 10 illustrate one form of steel rule die 120 comprising a relatively flat base member 121 having a series of aligned slots 122 therethrough which are separated at intervals by the bridges 123. The steel strip 124, which furnishes the cutting edge 126 for the die 120, has notches 127 which are provided by the machine 10 for the purpose of receiving the bridges 123.

Operation

Generally speaking, the notching machine 10 (FIGURE 1) is operated by first raising the manual lever or handle 102 and then placing a workpiece 118 adjacent to the rear face of the die 110. The handle 102 is then lowered whereby the punch 33 is caused to penetrate the workpiece 118 and take with it a piece of the material thereof which is urged into and through the opening 112.

More specifically, raising of the handle 102 from its FIGURE 3 position to its FIGURE 4 position causes the thrust bar 94 to be moved rearwardly, whereby the toggle joint 87 is contracted and the front end of the lever 81 is thereby moved upwardly. The corresponding downward movement of the rear end of the lever 81 acts through the thrust links 77 and 78 to contract the toggle joint 72, whereby the tool bar 32 is moved rearwardly away from the die 110.

If the workpiece 118 (FIGURE 4) is of relatively thin material, the stroke control 61 is moved into its FIGURE 4 position. This moves the pivot block 58, hence the toggle joint 72 and tool bar 32 toward the die 110, whereby downward movement of the manual lever, which results in forward movement of the tool bar 32, will cause the punch 33 to pass through the workpiece 118 and enter the punch opening 112. More specifically, downward movement of the handle 102 operates through the thrust bar 94 to move the toggle joint 87 into its extended position, whereby the front end of the lever 81 is moved downwardly. The corresponding upward movement of the rear end of the lever 81 operates through the thrust links 77 and 78 to extend the toggle joint 72, whereby the tool bar 32 is moved frontwardly. Because of the extreme mechanical advantage which is provided by the two toggle joints 72 and 87 and the two levers 81 and 102, the punch 33 easily notches the workpiece 118.

When a thicker workpiece must be notched, the stroke control 61 is moved into the position of FIGURE 3, whereby the toggle joint 72, hence the tool bar 32, is shifted rearwardly. However, as long as the manual lever 102 is not also moved during such rearward shifting, the elements of the toggle joint 72 will remain substantially in their same relative positions. When the manual lever 102 is now moved from its FIGURE 4 position into its FIGURE 3 position, the tool bar 32 will be moved, with the same mechanical advantage, toward the die 110, thereby penetrating the workpiece, but not passing completely therethrough. The stroke control 61 is thereafter moved into the FIGURE 4 position while, at the same time, the manual lever 102 is raised. As a result of this combined action, the thrust links 77 and 78 are moved downwardly and the yoke 63 is moved forwardly, whereby the tool bar 32 remains substantially in the same position with respect to the die 110. Accordingly, downward movement of the lever 102 will now cause the tool bar 32 to advance toward the die 110 so that the punch 33 will now pass completely through the workpiece 118, substantially as though the workpiece were of a thinner gauge. Thus, a thicker workpiece is cut by two operations, the first of which is performed with the stroke control 61 in its FIGURE 3 position and the last of which is carried out with the stroke control in its FIGURE 4 position. Obviously, the cutting operation can be performed in a plurality of steps by placing the stroke control 61 in several successive positions intermediate the FIGURE 3 and FIGURE 4 positions.

The toggle joints 72 and 87 are arranged so that they both operate substantially within the zones of their maximum mechanical advantages when the knee pins 76 and 96 thereof move from their retracted positions to their extended positions. Where a thick, relatively soft workpiece is being notched, the two movements of the tool bar 32 can be performed simultaneously by operating the stroke control 61 and the lever 102 at the same time. That is, the eccentricity of the wire ends of the shafts 42 and 43 is such that it provides a very substantial mechanical advantage.

The waste which is produced by providing the notches 127 in a steel strip 124 passes through the cavity 111 in the die 110 and into the receptacle 113. By appropriate adjustment the screw 62 in the block 58, the stroke, hence the power, of the tool bar 32 may be varied.

FIGURE 11 illustrates a modified stroke control device 130 which includes a pivot block 58a and a pair of stub shafts 42a and 43a, which may be rotatably supported upon the frame structure 11a in substantially the same manner set forth above with respect to their counterparts in FIGURE 8. However, the shafts 42a and 43a extend through the walls 13a and 14a, respectively, where the gears 128 and 129 are secured thereto. The lever or handle 102a is supported upon and rigidly secured to a shaft 131 which extends through and beyond the walls 13a and 14a in which it is rotatably supported. Two identical gears 132 and 133, which are secured to and rotatable with the extended ends of the shaft 131, engage the gears 128 and 129, respectively, and are arranged so that the throw of the eccentric inner ends on the stub shafts 42a and 43a is in its rearwardmost position when the handle 102a is in its raised position. Thus, when the handle 102a is lowered, the throw of said stub shafts combines with the movement produced by the toggle joint 72a to effect a continuous, power stroke which is substantially constant in force and equal in length to the combined length of the two strokes which were described above with respect to the operation of the machine shown in FIGURES 1 and 2. That is, one stroke of the handle 102a produces a maximum, full power stroke of the tool bar 32a, which results in a complete notching operation, even on thick strips.

Although a particular preferred embodiment of the invention has been disclosed above for illustrative purposes, it will be understood that variations or modifications of such disclosure, which lie within the scope of the appended claims, are fully contemplated.

What is claimed is:

1. In a compact machine for moving a tool with respect to a workpiece-holding device on said machine, the combination comprising:

a rigid frame;
   an elongated tool bar slidably supported upon said frame for movement lengthwise thereof toward and away from said holding device;
   a first toggle joint pivotally connected to and between one end of said tool bar and said frame, said first toggle joint extending substantially lengthwise of said tool bar;
   a first, manually operable lever pivotally supported near one end thereof upon said frame for movement around an axis near to said first toggle joint;
   a second lever pivotally supported upon said frame for movement around an axis spaced from the ends of said second lever and substantially parallel with the pivot axes of said first toggle joint, said lever being near to and substantially parallel with said tool bar;
   a link bar pivotally connected to and between one end of said second lever and the knee of said first toggle joint;
   a second toggle joint pivotally connected to and between the other end of said second lever and a point on said frame adjacent to said tool bar;

a thrust bar pivotally connected to and between the knee of said second toggle joint and said one end of said first lever, whereby pivotal movement of said first lever operates through said thrust bar, said second toggle joint, said second lever and said first toggle joint to effect lengthwise movement of said tool bar, said thrust bar being substantially parallel with and between said second lever and said tool bar;

a crank supporting the end of said first toggle joint remote from said tool bar on said frame; and actuating means for rotating said crank simultaneously with the operation of said first lever, whereby the remote end of said first toggle joint is moved lengthwise of said tool bar while said knee of said first toggle joint is being moved transversely of said tool bar.

2. A machine for developing a powerful, and substantially constant mechanical force, comprising:

a rigid frame;

an element supported upon said frame for slidable movement toward and away from a point on said frame;

a first toggle joint pivotally connected to and between one end of said element and said frame;

a first lever pivotally supported at a point spaced from its ends upon said frame near said first toggle joint;

a second lever pivotally supported at a point spaced from the ends thereof upon said frame, and a link bar pivotally connected between one end of said second lever and the knee of said first toggle joint for effecting said slidable movement of said element in response to pivotal movement of said second lever;

a second toggle joint pivotally connected to and between the other end of said second lever and said frame;

a thrust bar pivotally connected between one end of said first lever and the knee of said second toggle joint, whereby pivotal movement of said first lever operates said second toggle joint to pivot said second lever;

crank means pivotally supporting upon said frame the one end of said first toggle joint remote from said tool bar; and gear means connecting said first lever to said crank means whereby pivotal movement of said first lever effects movement of the knee of said first toggle joint with respect to said first frame and at the same time effects movement of said one end of said first toggle joint with respect to said point on said frame.

3. A compact machine for developing a powerful, and substantially constant mechanical force, comprising:

a rigid frame;

an element supported on said frame for slidable movement with respect to said frame along a path;

a first toggle joint pivotally connected at one end to one end of said element and at its other end to said frame at a point thereon substantially aligned with said path;

a first lever pivotally supported at a point spaced from its ends upon said frame near said first toggle joint;

a second lever pivotally supported at a point spaced from the ends thereof upon said frame, and a link bar pivotally connected between one end of said second lever and the knee of said first toggle joint for effecting said slidable movement of said element in response to pivotal movement of said second lever;

a second toggle joint pivotally connected to and between the other end of said second lever and a point on said frame near said element;

a thrust bar pivotally connected between one end of said first lever and the knee of said second toggle joint, whereby pivotal movement of said first lever operates said second toggle joint to pivot said second lever, said second lever and said thrust bar being substantially parallel with said path, and being near to and laterally aligned with said element;

crank means supporting the other end of said first toggle joint on said frame; and actuating means for operating said crank means whereby said other end of said first toggle joint can be moved lengthwise of said path while said knee of said first toggle joint is being moved by said levers transversely of said path.

4. A compact machine for moving a tool with a powerful and substantially constant mechanical force toward a workpiece-holding device on said machine, the combination comprising:

a rigid frame;

a tool element slidably supported upon said frame for movement along a path toward and away from said holding device;

a first toggle joint pivotally connected to and between one end of said tool bar and said frame, said first toggle joint extending substantially lengthwise of said path of movement of said tool element;

a lever pivotally supported near one end thereof upon said frame for movement around an axis near to the first toggle joint;

link means pivotally connected between the knee of the first toggle joint and the adjacent end of said second lever;

a second toggle joint connected to and between the other end of said second lever and a point on said frame near said tool element;

a thrust bar connected between the knee of said second toggle joint and one end of said first lever;

crank means pivotally supporting upon said frame structure the frame connected end of said first toggle joint; and actuating means connected to said crank means for rotating same simultaneously with the operation of said lever, whereby said first toggle joint can be moved substantially lengthwise of said path of movement of said tool element while said knee of said first toggle joint is being moved transversely of said path.

References Cited by the Examiner

UNITED STATES PATENTS

| 190,763 | 5/77 | Johnston | 83—630 |
| 1,007,792 | 11/11 | Orton | 83—630 |
| 1,893,705 | 1/33 | Jensen | 74—106 |
| 2,600,165 | 6/52 | Horgan | 83—556 |

FOREIGN PATENTS 1,062,043  7/59  Germany.

ANDREW R. JUHASZ, *Primary Examiner.*

WILLIAM W. DYER, JR., CARL W. TOMLIN,
*Examiners.*